Nov. 13, 1945.        P. H. CHASE ET AL        2,388,780
                      ELECTRIC FLASHER
              Filed March 21, 1941        6 Sheets-Sheet 1
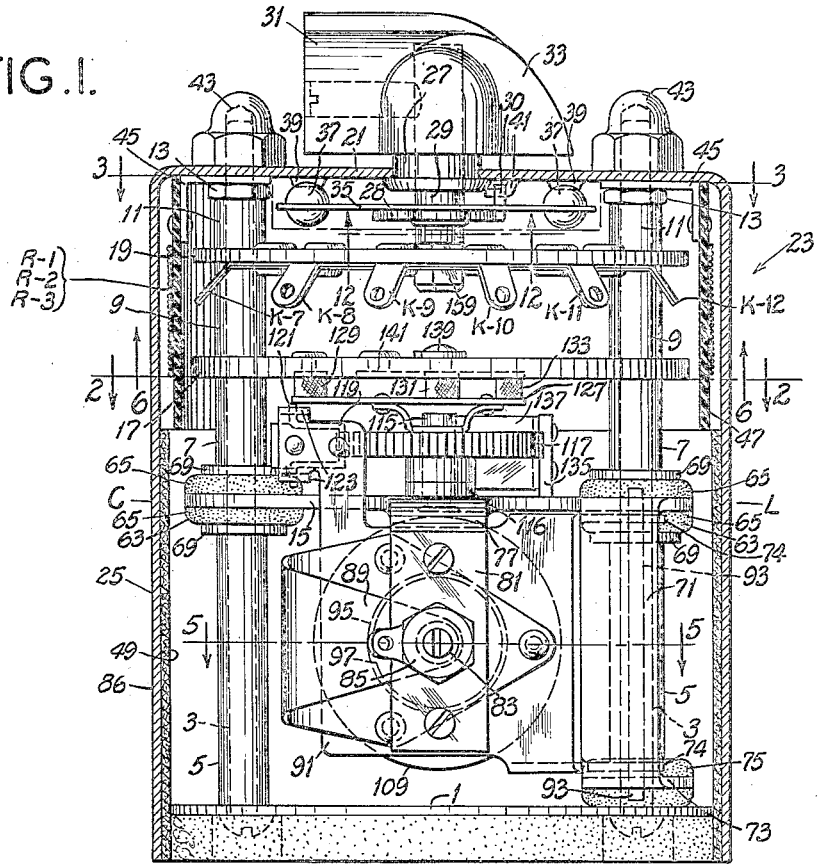
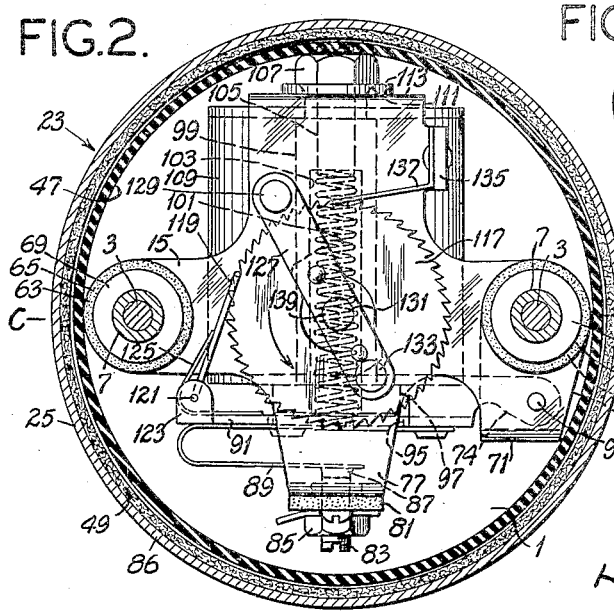
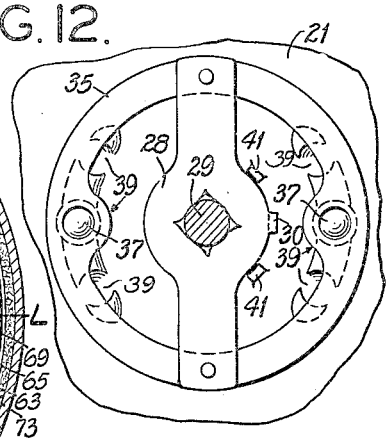
Philip H. Chase,
James V. O'Neill,
        Inventors.
Haynes and Koenig
        Attorneys.

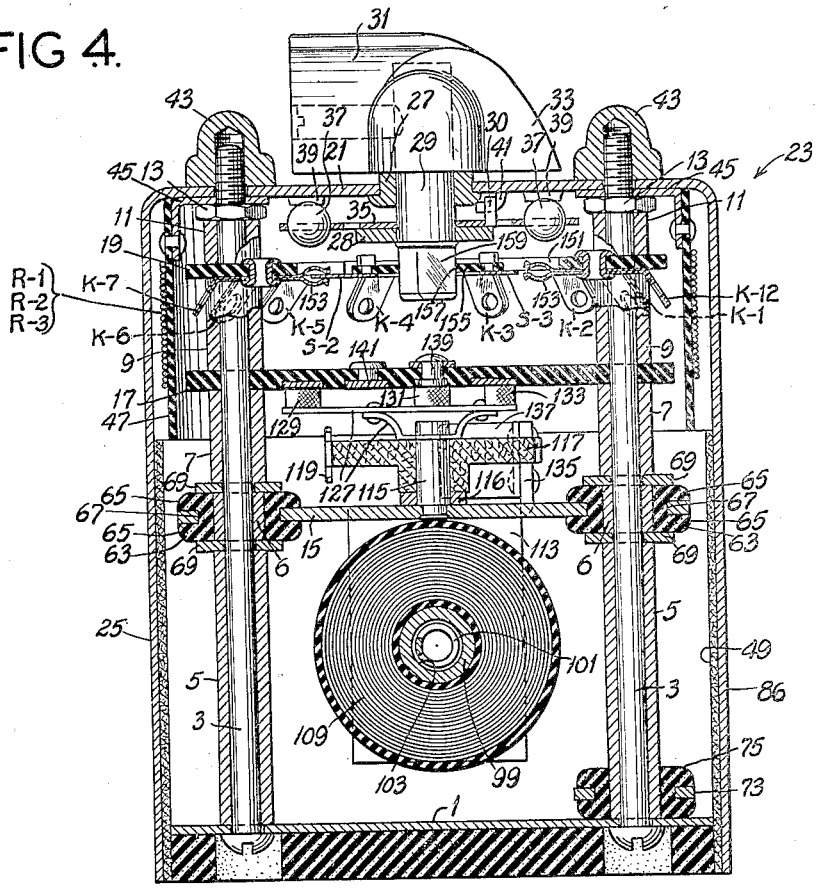
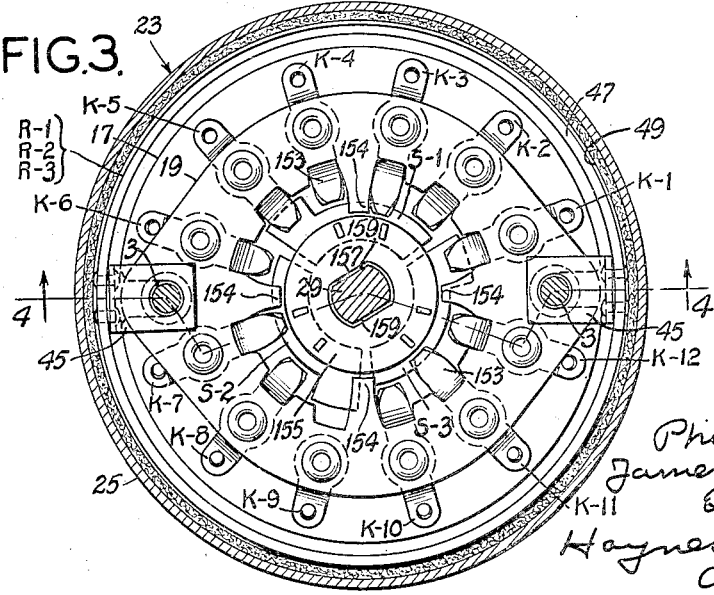

Nov. 13, 1945.　　　P. H. CHASE ET AL　　　2,388,780
ELECTRIC FLASHER
Filed March 21, 1941　　　6 Sheets-Sheet 3
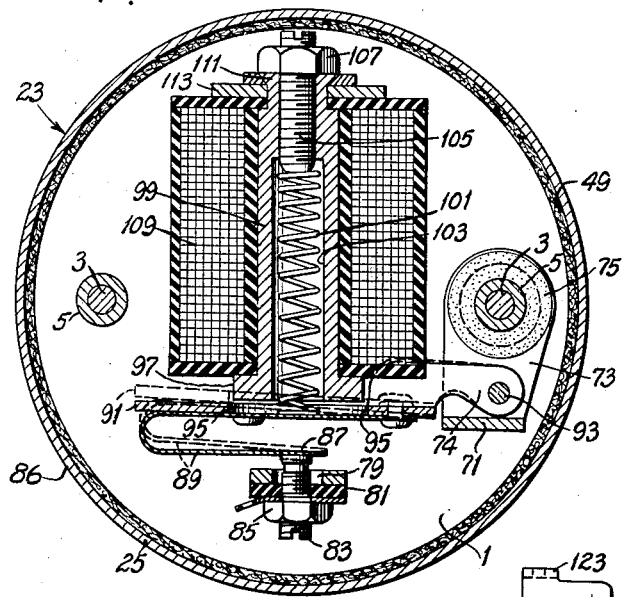
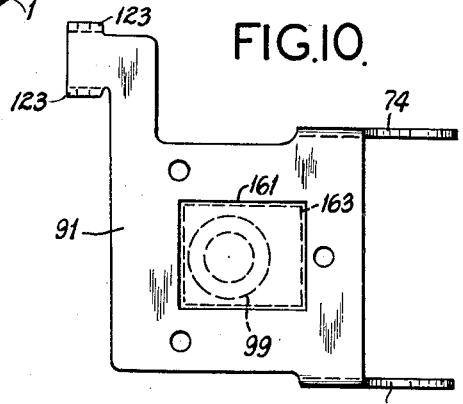
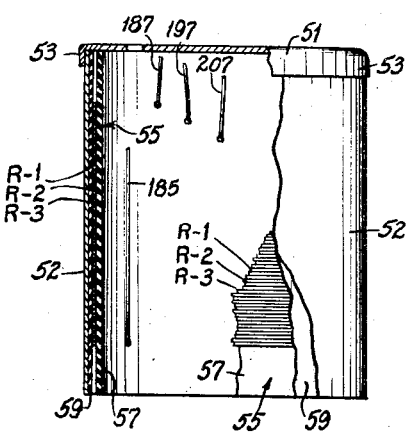
Philip H. Chase,
James V. O'Neill,
Inventors.
Haynes and Koenig
Attorneys Nov. 13, 1945.　　P. H. CHASE ET AL　　2,388,780
ELECTRIC FLASHER
Filed March 21, 1941　　6 Sheets-Sheet 4

Philip H. Chase,
James V. O'Neill,
Inventors.
Haynes and Koenig
Attorneys.

Nov. 13, 1945. P. H. CHASE ET AL 2,388,780
ELECTRIC FLASHER
Filed March 21, 1941 6 Sheets-Sheet 6
FIG. 13.
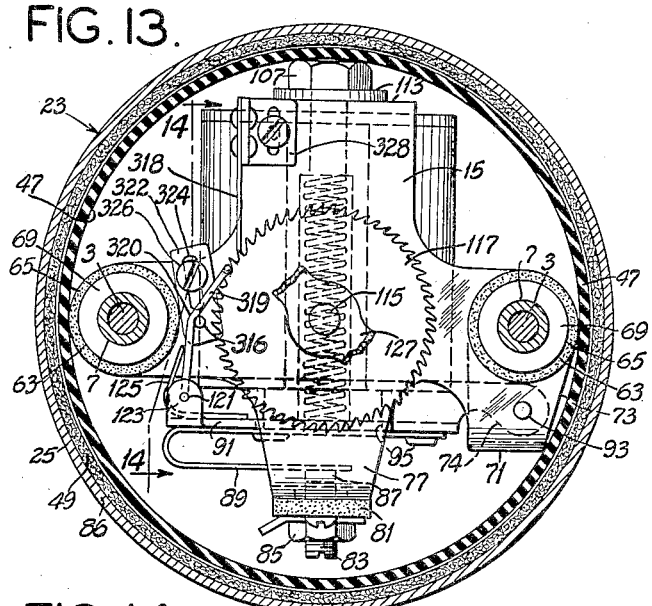
FIG. 14.
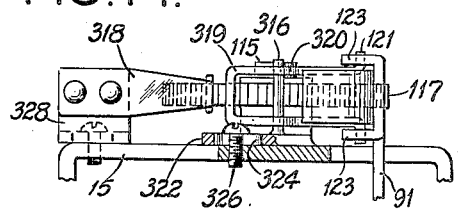
FIG. 15.
FIG. 17.
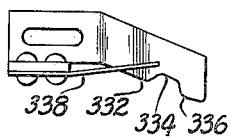
FIG. 16.
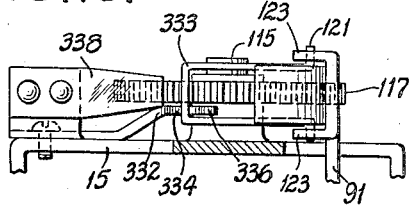
Philip H. Chase,
James V. O'Neill,
Inventors.
Haynes and Koenig,
Attorneys.

Patented Nov. 13, 1945

2,388,780

UNITED STATES PATENT OFFICE 2,388,780

ELECTRIC FLASHER

Philip H. Chase, Bala-Cynwyd, and James V. O'Neill, Willow Grove, Pa.; said O'Neill assignor to said Chase Application March 21, 1941, Serial No. 384,566

7 Claims. (Cl. 74—142)

This invention relates to electric flashers, and with regard to certain more specific features, to intermittently operable flashers, particularly for signalling from motor vehicles and the like.

Among the several objects of the invention may be noted the provision of a flasher which is quick starting, and which when made up either as a plain flasher or a sequence flasher provides a complete initial flash in each flash period, and which when made up in the form of a sequence flasher always initiates the signal at a desired (beginning) point in the flashing cycle, regardless of the direction of the flash sequence; the provision of a device of the class described which without the addition of auxiliary sounding parts provides an audible tell-tale for advising an operator of operating conditions; the provision of apparatus of the class described which operates reliably on a relatively low current and voltage and which is characterized by a substantially uniform flashing rate under widely different voltage and other conditions; and the provision of apparatus of the class described which is very small and compact and economical to manufacture, requiring little change in design to accommodate various numbers and sizes of lamps to be flashed. Other objects will be in part obvious and in part pointed out hereinafter.

The invention accordingly comprises the elements and combinations of elements, features of construction, and arrangements of parts which will be exemplified in the structures hereinafter described and the scope of the application of which will be indicated in the following claims.

In the accompanying drawings, in which are illustrated several of various possible embodiments of the invention, Fig. 1 is a vertical section taken through a distributor box, interior parts being shown in elevation;

Fig. 2 is a horizontal section taken on line 2—2 of Fig. 1;

Fig. 3 is a horizontal section taken on line 3—3 of Fig. 1, showing parts in neutral position;

Fig. 4 is a vertical section taken on line 4—4 of Fig. 3;

Fig. 5 is a horizontal section taken on line 5—5 of Fig. 1;

Fig. 10 is a detail view of an alternative form of magnetic armature;

Fig. 11 is a side elevation with parts broken away showing an alternative form of resistance spool and container;

Fig. 12 is a horizontal section taken on line 12—12 of Fig. 1, looking up;

Fig. 13 is a view analogous to Fig. 2 showing the details of an alternative form of ratchet driving mechanism;

Fig. 14 is a vertical section taken on line 14—14 of Fig. 13;

Fig. 15 is a view similar to Fig. 13 showing another form of the invention;

Fig. 16 is a vertical section taken on line 16—16 of Fig. 15; and,

Fig. 17 is a detailed plan view of a part of Figs. 15 and 16.

Similar reference characters indicate corresponding parts throughout the several views of the drawings.

The present invention is herein described as effecting sweep flashing, but it is to be understood that it is applicable to conditions of plain flashing, and for that purpose any lamp in the sweep-flash train of lamps to be described may be considered to be a plain flasher if the other lamps are extinguished, or if flashed simultaneously therewith by a connection therebetween.

In general, flashing is used to increase the attracting power of electric-light motor vehicle signals. Plain flashing is the flashing of a signal lamp or the simultaneous flashing of two or more lamps. Plain flashing is used in conjunction with shape-of-signal aspect, such as arrow or pointer, to indicate direction in the case of a direction signal. Use also is being made of light units with signal-aspect-shape of no directional significance per se, but relying for the directional message upon the right or left position of the signal on the vehicle, aided by plain flashing.

Directional or sweep flashing makes use of two or more lights, in a horizontal line on a motor vehicle, which are sequentially flashed in but one direction at a time and thus produce repeated "sweep-flashes," either left-to-right or right-to-left. The direction of travel of the light crests or flashes corresponds to the vehicle turn to be made. Between the successive flash traverses or sweeps are intervals of minimum illumination.

In actuating a motor vehicle signal to indicate a turn the driver is likely to allow but little time in anticipation of actually making the turn and the time may be insufficient for (a) the starting of the flashing apparatus, (b) the production of at least one flash cycle, and (c) recognition by those for whom the signal is intended. With some types of flashing apparatus the time interval between its energization and the inception of flashing comprises a large percentage of the total time from apparatus energization to signal recognition. For these reasons it is important to begin the first complete flash cycle as quickly as possible after signal apparatus energization and not to delay or confuse it by first completing any previously unfinished cycles or flashes.

Furthermore, in order to maintain the flashing rate within an optimum range for motor vehicle signals, the flashing equipment should have inherent constant-speed or frequency characteristics under the varying voltage and temperature conditions met with on the motor vehicle.

The present invention secures the advantages of quick signal inception with complete flash cycle starting at the beginning of the cycle and substantially uniform flashing rate, all afforded by relatively simple apparatus.

It is to be understood that the method and apparatus of the present invention is useful in other applications than to motor vehicles, for example traffic signals, signs, window displays and the like, wherein similar requirements may exist.

Figure 9:
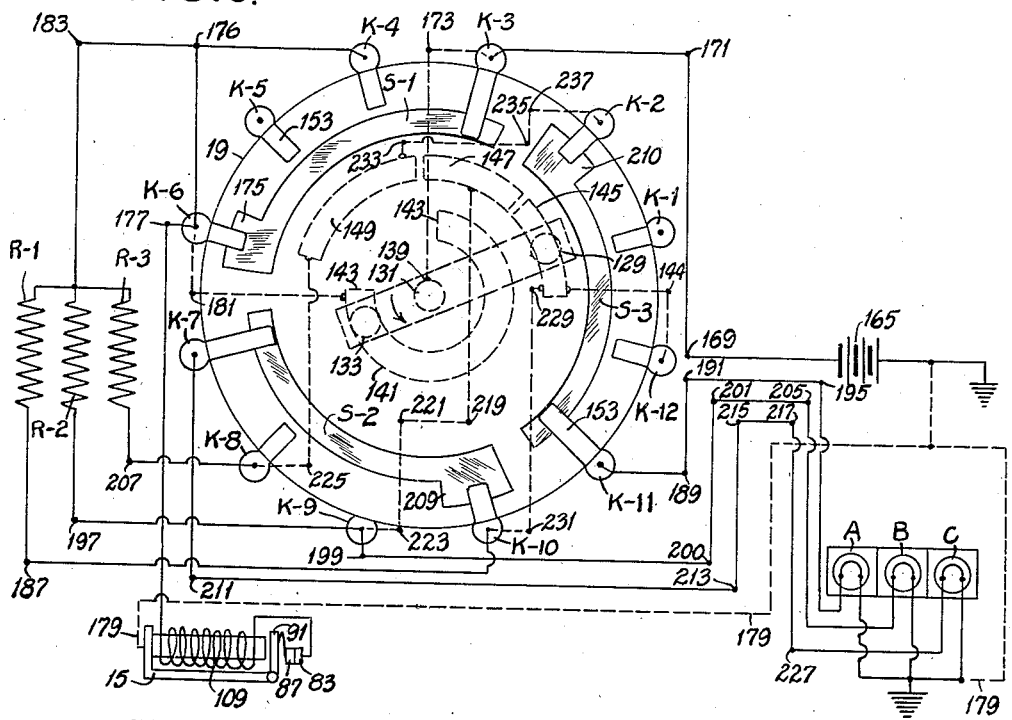
Fig. 9 is a view similar to Fig. 7, showing a setting for signalling a left turn.
Figure 6:
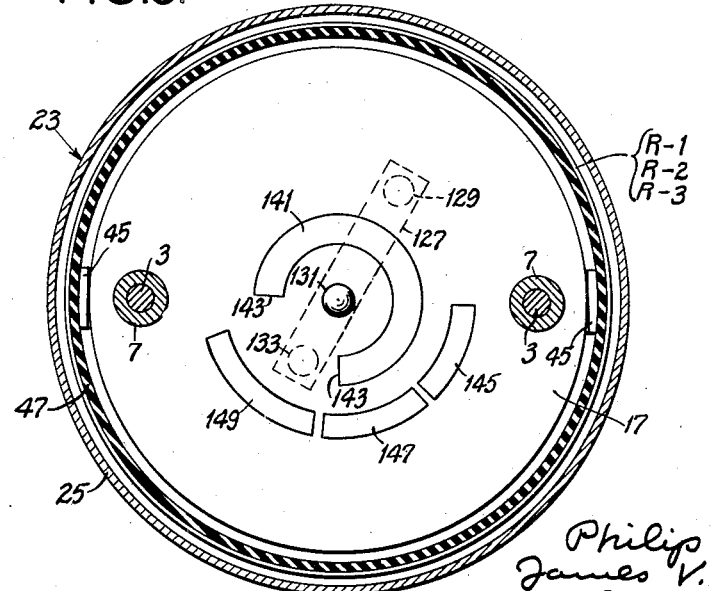
Fig. 6 is a horizontal section taken on line 6—6 of Fig. 1, looking up.
Figure 7:
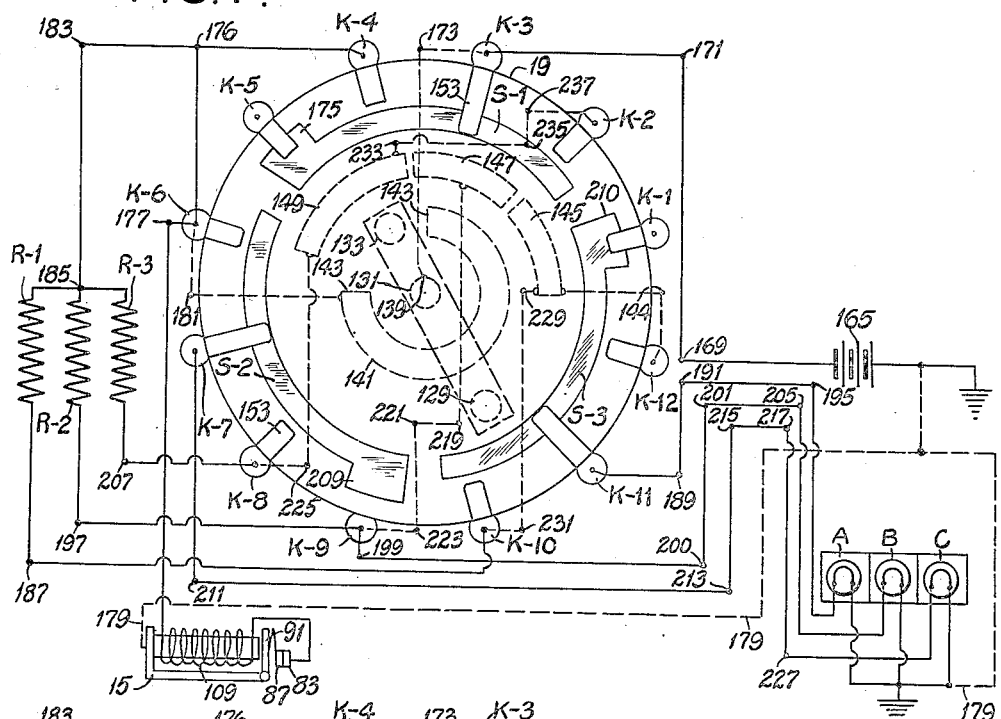
Fig. 7 is a wiring diagram showing a neutral setting.
Figure 8:
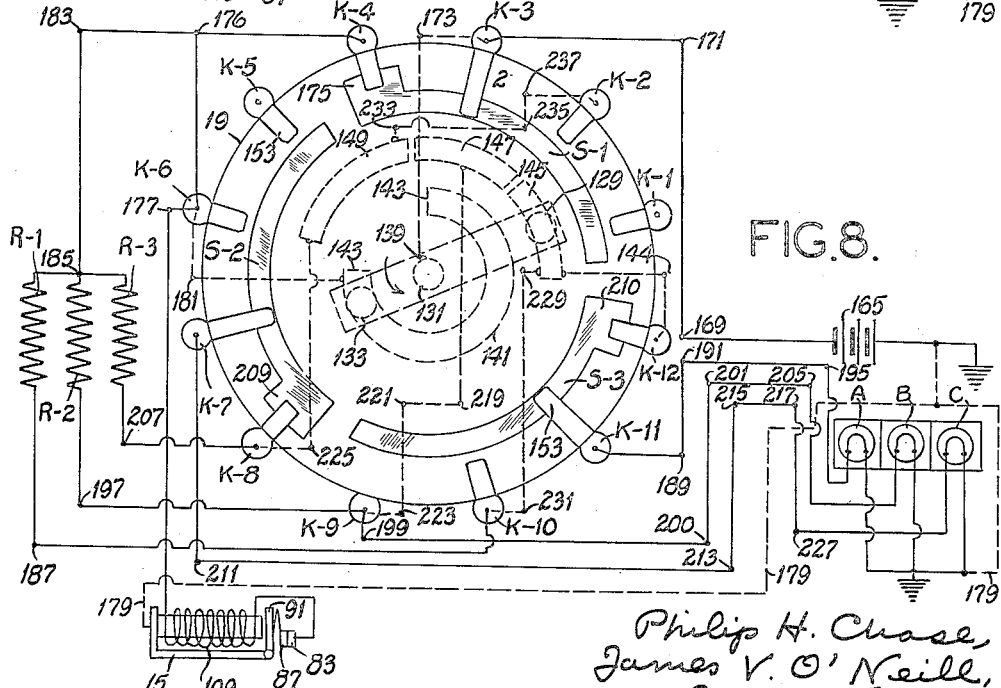
Fig. 8 is a view similar to Fig. 7 showing a setting for signalling a right turn.

Figs. 1-6 show the mechanical apparatus used in flashing signal lamps A, B and C shown in Figs. 7-9. The apparatus of Figs. 1-5 constitutes a direction switch and a timer to produce a directional signal consisting in repeated and unidirectional traverses of light flashes across lamps A, B and C, left-to-right or right-to-left, as determined by the position of the direction switch.

Referring now to the mechanical features of the invention (Figs. 1-6), these will be seen to comprise a base 1 from which extend upwardly two standards or draw screws 3, which are each surrounded in ascending order by spacing pillars 5, 7, 9 and 11. Above the uppermost pillars 11, nuts 13 are threaded over the draw screws 3, to pull together all of the spacing pillars 5, 7, 9 and 11, respectively.

Between the lower spacing pillars 5 and 7 is located a plate 15 forming a main support for vibrating motorizing apparatus to be detailed. Between the middle pillars 7 and 9 is clamped an insulating distributor plate or wafer 17. Between the upper pillars 9 and 11 is clamped an insulating switch plate or wafer 19. Wafers 17 and 19 may be integrated, if desired, in which event wiring between them may be eliminated. For clarity, this wiring is not shown in Figs. 1, 3 and 4 but is included in the wiring diagrams of Figs. 7-9.

Above the draw nuts 13, the threaded ends of the screws 3 pass through clips 45 of a resistance support 47 and through holes in the head 21 of a cylindric container or cover indicated in general at 23. Cover 23 has a skirt 25 extending from the head 21 and surrounding all of the working parts down to the base 1. The cover 21 has a central bushing 27 through which passes a control shaft 29. On the outer end of this shaft is a manual control button 31 including a suitable pointer 33 to indicate right, left and middle positions. On a motor vehicle the contact button 31, or equivalent hand-operated lever, may be located, for example on the steering column and the flasher mounted under the cowl or hood, with mechanical connections therebetween, for example a solid or flexible shaft, to operate the control shaft 29.

Carried on a fixed arm 28 on the shaft 29 (inside the head 21) is a spring ring 35. This ring supports in suitable openings detent balls 37, which cooperate with detents 39 formed under head 21, so that, when the handle 31 is turned, it may take up either one of three predetermined positions, namely, a central neutral position, a left-hand position, or a right-hand position. Limiting stops 41 under head 21 prevent excessive movement of the handle 31, being engaged by a finger 30 struck up from 28 and passing through the opening in spring ring 35. The springiness in the plate 35 permits the balls 37 to ride over the raised ports between detents 39, as required.

The head 21 is held down on the nuts 13 by means of acorn nuts 43. Held between the cover 21 and said nuts 13 are the clips 45, to which is riveted an insulating fibre cylinder 47, the latter being positioned as a depending skirt between skirt 25 and around the wafers 17 and 19. On the outside of the insulating skirt 47 are wound parallel lamp-dimming resistances R—1, R—2 and R—3, the connections for which will be specified when describing Figs. 7-9. These resistances are wound on cylinder 47 and hence around other parts of the device, whereby space is conserved. They are thus also placed in maximum extended position in addition to being opposite to the skirt 25, for maximum heat loss by radiation to and conduction through skirt 25. The inside of the lower portion 86 of skirt 25 is lined with felt, as indicated at 49 for sound-deadening purposes. In addition the fibre cylinder 47 has a sound-deadening effect. The degree of sound-deadening may be varied considerably by the nature, amount and location of the skirt lining 49 and of the fibre cylinder 47 (see Fig. 11).

The supporting plate 15 is supported by rubber grommets or eyelets 63 on the screws 3, the edges 65 of the grommets extending around plate openings 67. On opposite sides of the grommets are pressure washers 69 which are subject to the compressive action of the adjacent spacing pillars 5 and 7. A spacing pillar 6 spaces the pressure washers on the opposite sides of each of these grommets to secure the desired degree of compression and resilient hold of plate 15. This permits the plate to rock somewhat under the action of the vibratory action to be described as taking place around the horizontal center line indicated at C—L in Figs. 1 and 2.

In order further to limit the desired rocking, the plate 15 is provided with a downward extension 71 which includes a horizontal portion 73 with an opening in it for the reception of a third grommet 75 surrounding one of the lower pillars 5. The lower grommet 75 is not subject to normal compression or pinching action, such as by the washers 69 used in connection with grommets 63 on center line C—L. Thus the limited rocking action of the plate 15 around the center line C—L is permitted by the substantial movement at a substantial radius of the horizontal portion 73 in the unpinched grommet 75. But this horizontal motion is limited and is damped by said grommet 75.

Grommet 75 may be omitted where the limiting of rocking and damping of vibration, afforded by the grommets 63, is sufficient. In this case, horizontal portion 73 is omitted.

It is apparent that, alternative to grommet 75, as a means of limiting and damping the rocking movement of plate 15, the insulating distributor plate 17 may be rigidly supported and spaced from plate 15, for example by spacing pillars similar to pillars 7, or by upward extensions of plate 15, with rivets or draw screws therethrough. In this modification one spacing pillar spaces washer 69 from insulating wafer 19. The holes in plate 17, through which pass said spacing pillars, accommodate normally uncompressed or pinched grommets similar to grommet 75.

By means of the resilient mounting of plate 15, the vibrations caused by the interaction therewith of the vibrating motor parts are dampened and the sound vibrations produced thereby and transmitted through solid parts to the external parts are substantially reduced.

Under some conditions the sound from the flasher may be useful to indicate operation. If a higher level of sound is desired, grommets 63, pressure washers 69 and spacing pillars 6 may be omitted, plate openings 67 reduced to pass merely screws 3, and the plate 15 held rigidly by spacing pillars 5 and 7.

At the lower end of a second vertical portion 77 (from plate support or frame 15) is an opening 79 (Fig. 5). Surrounding this opening is an insulating plate 81 through which is threaded an adjustable contact 83 adapted to be locked into adjusted position by a lock-nut 85. This contact 83 is engageable by a second vibrating contact 87 located on a spring-bronze conducting spring 89. Spring 89 is riveted to a magnetic armature 91 rotatable on a pin 93 behind the vertical portion 77 and between the plate 15 and horizontal member 73. Ears 74 on the armature form the rotary connection with pin 93.

In the armature is an opening 95 which when the armature 91 is in the dotted-line position (Fig. 5) tends to surround the end 97 of a magnet core 99. This armature with a hole in it is to be distinguished from armatures which have magnetic material opposite the end of the magnet core, because, by means of this hole and movement of the periphery of the hole adjacent to the periphery of the member 97 of the core 99, there is obtained decreasing end pulling force as the armature laps the magnetic core end instead of an increasing end pulling force theretofore. Thus in pulling the armature toward the core, and at about the time that the contacts 87, 83 break, the end pull of the magnet becomes substantially reduced and there is no core-end contact at the end of the armature movement, and sound produced by such contact is avoided. It is clear that the end-pulling force of the magnet core or pole face 97 alters to radial as the armature encircles core end 97. It will be understood that the portion of the spring member 89 which is shown as covering the opening 95, being made of spring bronze which is not magnetic, does not affect the magnetic action.

The decreasing end pull on the armature as it approaches the core end and the avoidance of armature core end contact contribute to smooth, steady vibratory action, and unneeded noise is avoided.

Return vibratory action of the armature is effected by means of a spring 101 in a hollow portion 103 of the core 99, said spring reacting from an adjustable set screw 105 (locked in position by a lock nut 107) and against the portion of the bronze spring 89 which covers the opening 95 (Fig. 5).

Surrounding the core 99 are the insulated windings of a solenoid 109 which is supported on said core. The core is riveted, as indicated at 111, to a rearward portion 113 extending down from said supporting plate 15.

Any energization of the solenoid 109 through the contacts 83 and 87 will result in vibratory action of the armature 91 in a horizontal plane below center line C—L and substantially at right angles thereto. Because the center line of the coil 109 is below and at right angles to the center line C—L, there is the limited rocking action above-mentioned around the upper grommets 63 and a freer but still damped motion at the unpinched lower grommet 75.

Riveted to the horizontal supporting plate 15 is a fixed vertical pin 115 upon which is a rotary, preferably fibre (insulating) ratchet wheel 117. A washer 116 is placed below the ratchet 117. This ratchet wheel 117 is advanced tooth-by-tooth by means of a pawl 119. Pawl 119 in the form of a hardened wire bail is pivoted at 121 between ears 123, the latter extending from said armature 91. Extending up from the plate 15 is a lug 135 to which is riveted a spring 137 the end of which engages the teeth of the ratchet 117 to prevent their return action when the pawl 119 moves over a return stroke, as distinguished from a driving stroke. The stroke of the pawl 119 is intended to be such as to advance the ratchet one tooth at a time, the adjustments of the contacts 83 and 87 and of abutment 105 being arranged to produce this effect. A spring 125 biases the pawl 119 against the teeth of the ratchet 117 and upon vibration of the armature 91 the pawl advances the ratchet tooth-by-tooth. Since the vibrations are rapid, the rate of rotation of ratchet 117 is substantial and as desired, due to the adjustments 83 and 105, and the proportioning of parts 89 and 91.

While a spring-driven ratchet is shown, it will be understood that the drive may occur upon the magnetically actuated stroke of the armature, rather than upon the spring-actuated stroke.

Fastened to the ratchet by means of a conducting spring support 127 are brushes 129, 131 and 133. It will be understood that the brushes, while conductively related by the support 127, are wholly insulated on the fibre ratchet 117. Since these brushes are spring mounted by 127, the vibratory rocking above described does not interfere with the brush contact operations to be described.

The middle brush 131 is co-axial with the shaft 115 and engages a central contact 139 mounted in the insulating distributor plate 17. Mounted on the plate 17 and around the central contact 139 is a second, horseshoe-shaped contact 141, between the adjacent ends of which is an opening 143. This contact 141 is engaged by the rotary brush 133. Concentric with the horseshoe-shaped contact 141 and at a greater radius in plate 17 are mounted three contacts 145, 147, 149 which, successively considered, are spaced and each is longer than the preceding one. The three of them are also mounted concentric with respect to the center contact 139 and are successively engaged (shortest first) by the outermost rotary brush 129 as it moves counterclockwise, viewed from above. The spaces between contacts 145, 147, 149 are preferably lapped by the width of brush 129, for the sequential flashing herein described.

The insulating plate or wafer 19 has a central opening 151. Riveted to its edges are radially located contacts K—1 to K—12. The contacts K—1 to K—12 are riveted to the plate 19 and (except K—9 which serves merely as a connection terminal) extend radially inward where they are provided with spring fingers 153 which are selectively engageable by switch blades S—1, S—2, S—3. The switch blade rotor 155 is centered by four holding fingers 154. The blades are riveted to the switch blade rotor or central insulating member 155 which has a hole 157 in the center with flat sides to accommodate the flattened end 159 of the control pin 29 extending from the control handle 31. Thus by rotation of the handle 31 into any one of its three detent positions, any one of three positions of the switch blades S—1, S—2 and S—3 may be determined with respect to the contacts K—1 to K—12.

Referring now more particularly to Figs. 7-9, like numerals designate like parts. Since in Figs. 1-6 the ratchet 117 is rotary in a counterclockwise direction when looking down on the apparatus, it has been so indicated in Figs. 7-9 and the contacts laid out accordingly. At 165 is an energizing battery which through points 169, 171, contact K—3 and point 173 energizes the center contact 139 and thus the brushes 131, 133 and 129. Since brushes 133 and 129 at this time engage no contact, they energize nothing in the neutral position of parts shown in Fig. 7. Thus the solenoid is not energized to rotate the brushes and no lamps A, B or C are burning.

When a right-turn setting is made of the control handle 31, the switches S—1, S—2 and S—3 become rotated clockwise (Fig. 8). The brush S—1 is always in sliding contact with the contact K—3, and in moving from the Fig. 7 to the Fig. 8 position an extension 175 thereon comes into engagement with the contact K—4. The battery then supplies the following circuit: points 169, 171, contact K—3, switch blade S—1, contact K—4, point 176, contact K—6, point 177, solenoid 109, contacts 83, 87, armature 91 and then to ground via the dotted line 179. The armature 91 which carries the contact 87 is suitably grounded for this purpose by grounding its support 15. The above connection has the result of causing vibration of the armature 91 with a make and break at the contacts 83, 87. The result is that the vibrating pawl 119 drives the ratchet 117 counterclockwise to rotate the brushes 129, 131 and 133 at a substantial rate.

As soon as brush 133 moves, it promptly engages the contact 141 and then the solenoid 109 is additionally energized by flow of current from the center contact 139, brush 133, contact 141, point 181, contact K—6, point 177, coil 109, contacts 83, 87, support 15 and ground 179. Thus, even though the handle 31 should at this or any subsequent time be returned to neutral, the solenoid motor continues to drive the contact 133 to produce a complete series of flashes (the cause of which will be described) and at least until the brush 133 runs off the contact 141, and into open space 143. Of course, if the button 31 is not returned to neutral, the solenoid will continue to rotate the brushes indefinitely.

Assuming that the handle 31 has not been returned to neutral position, but remains for some time in the Fig. 8 position, the outer brush 129 serially engages the sector contacts 145, 147, 149.

In the absence of brush 129 being on one of the contacts 145, 147 or 149, all of the lamps A, B and C are energized (burn dimly) through the resistances R—1, R—2, R—3, as follows (Fig. 8): battery 165, points 169, 171, contact K—3, blade S—1, contact K—4, points 176, 183, 185, and then through the resistances R—1, R—2 and R—3 in parallel.

Resistance R—1 connects point 185 with point 187, contact K—10, points 231, 229, contact 145, point 144, contact K—12, switch blade S—3 through extension 210 thereon, contact K—11, points 189, 191, 195 and then through the lamp A back to the battery 165 via ground, as shown.

Resistance R—2 connects point 185 with point 197, terminal K—9, points 199, 200, 201, 205 and then through the lamp B and back to the battery 165, via ground.

Resistance R—3 connects point 185 with point 207, contact K—8, switch S—2 through an extension 209 thereon, contact K—7, points 211, 213, 215, 217 and 227, then through the lamp C and back to the battery 165, via ground.

From the above it will be seen that all of the lamps A, B and C burn dimly as soon as the switch blades S—1, S—2 and S—3 are thrown into right-turn position. Then, as the brush 129 rotates counterclockwise across the contacts 145, 147, 149 the current to the lamps A, B and C is circuited in parallel around the respective resistances R—1, R—2 and R—3, as follows (Fig. 8):

When the brush 129 engages contact 145, lamp A is energized as follows: battery 165, then 169, 171, K—3, 173, 139, 131, 129, 145, 144, K—12, S—3, K—11, 189, 191, 195, lamp A, and to the battery 165, via ground. Under these conditions the lamp A burns brightly during the period that the brush 29 traverses the contact 145. When the brush leaves the contact 145, the lamp A is again energized only through the resistance R—1, and burns dimly until brush 129 re-engages contact 145.

When the brush 129 engages contact 147, the circuit is as follows, starting with the center contact 139 which is energized as before: 129, 147, 219, 221, 223, K—9, 199, 200, 201, 205 and through the lamp B back to battery 165, via ground. The lamp B burns brightly for an interval longer than the interval of burning of lamp A because the contact 147 is longer than the contact 145. It will be noted however that the lamp A does not go dim until lamp B is energized brightly.

Lamp C is caused to burn brightly when the brush 129 engages contact 149 as follows, starting with the center contact 139 which has been energized as before: 129, 149, 225, K—8, extension 209 of S—2, K—7, 211, 213, 215, 217, 227 and through the lamp C to the battery 165, via ground. The lamp C burns brightly for a longer interval than lamp B because of the greater arc of contact 149.

When the handle 31 is turned to neutral position, the brush 129 ceases its rotations over contacts 145, 147, and 149, but not until the brush 133 runs into its disconnected position in space 143 in the contact 141, as above made clear. This feature assures starting always at the beginning of a cycle. That is, when the brush 133 is in the space 143 in contact 141, which is its stopping position, the brush 129 is not engaging one of the three contacts 145, 147, 149. This assures that the initial flashing operation will never occur in such a way as to finish up a flash that was formerly ended on any lamp A, B or C, and will always occur in such a way that never is there any unfinished sequence required to be finished. The moment of inertia of the ratchet 117 and the switch parts connected with it is such that as soon as the pawl 119 stops the ratchet stops. The braking action of the pawl 119 and spring 137 contribute to this result.

The principles of the invention apply to plain flashing, as well as to sequence flashing, as for example if any two of the lamps A, B and C were disconnected the remaining one would work as a plain flasher, according to the principles emphasized in the last paragraph above. The device would also operate as a two-lamp sequence flasher by disconnecting the center lamp B, or lamps A and C, for example, may operate simultaneously in plain flashing with the three contacts 145, 147 and 149 connected together or merged into one contact of arcuate length to secure the desired flash duration. Resistances R—1, R—2 and R—3 may be omitted under conditions where lamp darkness between flashes is desired. For such lamp flashing arrangements, appropriate omission of certain of the contacts K—1 to K—12 would be made.

It is also apparent that the lamps A, B and C, or any of them, can be utilized for other functions than direction signalling (for example, for tail lights, stop lights or parking lights), when the handle 31 is in neutral position and the necessary connections for such function made through another switch plate similar to switch plate 19 mounted similarly thereabove on the draw screws 3, and spaced therefrom by pillars similar to pillars 9. Conversely, in case the desired function of the apparatus is merely as a flasher and an external switch is utilized for its energization and the connection of the lamp or lamps to be flashed, the switch plate 19, control shaft 29, control button 31, spring ring 35 and their appurtenant parts, are omitted, and the connections to contacts 139, 141, 145, 147 and 149 are brought from said external switch. Thus, the construction illustrated is readily adapted to meet a wide range of applications, such as for example, type of flashing, lamp functions and number, and installation conditions.

In Fig. 9 is shown the electrical conditions for left-turn, when the handle 31 is thrown counter-clockwise into left-turn position. Like numerals designate like parts. In this case the solenoid 109 and the resistances R—1, R—2 and R—3 are energized from contact K—6, instead of from contact K—4, the extension 175 of brush S—1 having been moved over to contact K—6 as shown.

The brushes 129 and 133 still operate counter-clockwise in Fig. 9 because the vibrator, when energized, still drives the ratchet 117 counter-clockwise. It is therefore necessary to reverse the connections of the first and last arcuate contacts 145 and 149 in order to obtain a reversal of the flashing sequence from A, B, C to C, B, A, to indicate a left turn. This occurs as follows (Fig. 9):

When brush 129 is on contact 145 the circuit starting with the center contact brush 131 is, brush 129, contact 145, then 229, 231, K—10, S—2 (through extension 209), K—7, 211, 213, 215, 217, 227 and then through the lamp C back to the battery 165, via ground. This brightly lights lamp C.

Next, when the brush 129 engages the contact 147, lamp B is energized brightly as follows, starting with brush 129, contact 147, then 219, 221, 223, K—9, 199, 200, 201, 205 and then through lamp B back to the battery 165, via ground. This series of connections for the middle arcuate contact 147 is the same as under the right-turn conditions. This is because the connection between the battery and the lamps through the contact 147 is independent of any of the switch blades S—1, S—2 or S—3. Switch blade S—1 is used only for the purpose of initially feeding from the battery the resistances R—1, R—2 and R—3 and the solenoid 109, in either the right-turn or left-turn positions of the handle 31.

When the brush 129 engages arcuate contact 149, the connections are as follows, starting with brush 129, contact 149, then 233, 235, 237, contact K—2, switch blade S—3 (through extension 210), K—11, 189, 191, 195 and then through the lamp A and to the battery 165, via ground. Lamp A then burns brightly.

In Fig. 11 is shown an alternative form of the resistance-supporting cover, consisting of a top 51 flanged as shown at 53 to receive snugly a metal casing 52 in the interior of which is snugly fitted a double-walled cylinder 55. Cylinder 55 consists of an inner insulating cylinder 57 and an outer insulating cylinder 59 between which are carried the resistances R—1, R—2 and R—3. This cover may be used instead of the cover 21, 25, and 47 heretofore described. It has the advantage that the sound-deadening effect and proper support of the resistance wires is effected by the insulation mounted on and within the metallic sleeve itself.

In Fig. 10 is shown an alternative form of the armature 91. Here it is provided with a rectangular opening 161 for cooperating peripherally with a rectangular end face 163 of the core 99. This illustrates one of the equivalents which may be constructed for converting the endwise pull of the core 99 upon the armature 91, when separated from the core, into a radial pull without substantial endwise pull as the armature is drawn closer to the core, whereby the easy vibrating action is obtained as above described.

One advantage of the device, in addition to the above, is the fact that the unit is all contained in the housing 23 which in practice is only 2¼″ in diameter and 2¾″ long, and whose volume is only 11 cubic inches. The switch operating handle 31 extends out from the parts whose dimensions have been stated. This is in addition to the small volume and dimensions of the device used for housing separately the lamps A, B and C. Thus, the whole device is extremely compact and yet quite reliable.

It may be noted that 17 in effect is a distributor wafer and 19 a switch wafer, and that these items 17 and 19 may be integrated or organized together. As shown in the present drawings, their electrical interconnections and those of the resistances R—1, R—2, R—3 and the lamps or signals A, B, C are shown only in Figs. 7-9. These interconnections have been omitted from Figs. 1-6 for clarity, but it will be understood that these may be effected by soldering, lugs, or the like.

It will be understood that where audible, tactual or other signals are desirable, these may be substituted for the visible lamps A, B and C.

Also it is apparent that with the addition of more contacts similar to 145, 147, 149, a correspondingly increased number of lamps may be sequentially flashed, and the necessary control and switching thereof provided by one or more switch wafers 19 with suitable radial contacts and switch blades.

The use of a vibrator-solenoid motor for rotating the distributor brushes has an added advantage in providing a sound regulated within substantial limits when the device is set into right- or left-turn position, which can be utilized to indicate operation and to remind the operator to turn it off after a right or left turn has been negotiated. The sound-deadening jacket further regulates this sound.

It is apparent that, if in addition light signals are desired on the instrument panel of the automobile, these can be readily arranged in the circuit, as for example in parallel with the lamps A, B, C, respectively.

Referring now to Figs. 13 and 14, like numerals designate like parts. In this form of the invention, the bail 319 is constructed with a bend 320 in its own plane at about the midpoint of its length. Pin 316 is mounted vertically on a slidable yoke 322 which has a slot 324 for adjustably holding it to plate 15 by means of a screw 326. At a predetermined point in the retractive travel of bail 319, the outward bend portion contacts the pin 316 and forces the bail end out of engagement with the tooth of the ratchet wheel 117 after a one-tooth advance.

A detent spring 318 is mounted on a turned-up lug 328 which is also fixed but adjustable on the plate 15. The detent 318 is located so that it engages at a tooth position predeterminately clockwise from the tooth position at which the pin 316 causes disengagement of the bail 319 from the teeth. The end of bail 319 in its normal return travel picks up the tooth in position next counterclockwise to the end of the detent 318 and carries this tooth with which it is engaged, one tooth pitch counterclockwise, and is then disengaged by contact of the outward bent portion 320 with the pin 316. Under conditions resulting in the driving of bail 319 beyond the above-described pick-up position, the bail end rides over the end of the fixed detent 318, which serves as a mask preventing engagement by the bail end at any point clockwise of the predetermined tooth pick-up position.

Another method of securing positive single tooth advance is illustrated in Figs. 15-17. In this case, the adjustable mask 332 extends upwardly from the base 15, closely adjacent and parallel to the under edge of the ratchet wheel 117, near its circumference. The bail 333 is constructed with a loop sufficiently wide that the lower leg of it is below the mask 332. Thus the end of the bail passes across the mask 332 and is actuated outwardly from the ratchet wheel by the mask when it makes contact therewith on the back stroke. Mask 332 has a recessed pick-up portion 334 and a cam kick-off portion 336. An adjustable detent 338 is mounted on the same piece as the mask 332. In this embodiment the fixed detent 338 does not act as a mask. The mask 332 and the cam portion 336 of the mask extend slightly beyond the outer circumference of the ratchet wheel 117 so that whenever the end of the bail passes over these portions it is forced out of engaging position with the ratchet wheel 117, but when it rides into the recess 334 it is in engagement. The engagement is for a circumferential distance such that during engagement advance of the ratchet wheel is over a single tooth pitch.

In both of the forms of the invention shown in Figs. 13 and 15, the bails 319 and 333 are biased toward the ratchet wheel by a spring 125.

The device operates reliably and smoothly under conditions of variable voltage, which may vary widely, as from 5 to 7½ volts, on a motor vehicle with a nominal 6-volt system.

It is clear that the magnetic pull on the armature will be increased when the voltage is higher than the 6-volt normal and the pull will be decreased when the voltage is less than 6 volts. The travel of the armature is permitted to be greater under the increased impulse at the higher voltages, with less travel under the reduced impulse at the lower voltages. Regardless of the intensity of the impulse, the deceleration of the armature is smooth and without impact by virtue of the resilient braking at each end of the stroke. In combination the ratchets of Figs. 13-17 give complete assurance of equal motions under the various impulses.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. In combination, a motor adapted to be driven from a source of power of variable intensity comprising a rapidly vibrating arm whose stroke varies with said intensity, a pawl and ratchet mechanism driven by said arm, said arm being adapted to oscillate rapidly between variable limits, and means associated with the pawl and the ratchet for preventing the pawl from moving the ratchet more than a predetermined amount for each oscillation of said pawl regardless of the intensity of the impulse or the amount of the resulting oscillation.

2. The invention set forth in claim 1 characterized in that said means guides said pawl into engagement with the ratchet at a certain point in the path of movement of said pawl and out of engagement with said ratchet at another point in said path.

3. In combination, a motor adapted to be driven from a source of electrical power of varying voltage comprising a rapidly vibrating arm whose stroke varies with said voltage, a pawl and ratchet mechanism driven by said arm, said arm driving the pawl, the extreme positions of the arm being characterized by the absence of any precise limits, and means associated with the pawl and ratchet to advance the ratchet only a predetermined amount for each vibration of said arm regardless of the particular limits of said vibration.

4. In combination, a motor adapted to be driven from a source of power of variable intensity comprising a rapidly vibrating arm whose stroke varies with said intensity, and a pawl and ratchet mechanism driven by said arm, the vibrations of said arm having no fixed limits, the pawl being pivotally attached to said arm and engaging with and adapted to drive said ratchet, the vibrations of the pawl also having no fixed limits, a guide member, said member and said pawl being cooperatively related such that during part of the vibratory travel of the pawl said member is engaged by the pawl intermediate its pivot and the point where said pawl engages the ratchet to force the pawl out of engagement with the ratchet.

5. In combination, a motor adapted to be driven from a source of electrical power of variable voltage comprising a rapidly vibrating arm whose stroke varies with said voltage, and a pawl and ratchet mechanism driven by said arm, the pawl being pivotally attached to said arm and having a ratchet-engaging element adapted to drive said ratchet, the vibrations of the pawl having no fixed stroke, a guide member disposed transversely to said pawl, said member and said pawl being cooperatively related such that during part of the vibratory travel of the pawl said member is engaged by the pawl intermediate its pivot and said element to force the pawl out of engagment with the ratchet.

6. In combination, a motor adapted to be driven from a source of electrical power of variable voltage comprising a rapidly vibrating arm whose stroke varies with said voltage, and a pawl and ratchet mechanism driven by said arm, the pawl being pivotally attached to said arm and having a ratchet-engaging element adapted to drive said ratchet, a guide member disposed transversely to said pawl, said member and said pawl being cooperatively related such that during part of the vibratory travel of the pawl said member is engaged by the pawl intermediate its pivot and said element to force the pawl out of engagement with the ratchet, a detent for preventing reverse rotation of the ratchet, said detent being so positioned and related to the pawl that said element of the pawl slides over said detent and out of engagement with the ratchet during another part of the traveling of the pawl.

7. In combination, a motor adapted to be drien from a source of electrical power of variable voltage comprising a rapidly vibrating arm whose stroke varies with said voltage, and a pawl and ratchet mechanism driven by said arm, the pawl being pivotally attached to said arm and having a ratchet-engaging element adapted to drive said ratchet, an adjustable guide member disposed transversely to said pawl, said member and said pawl being cooperatively related such that during part of the vibratory travel of the pawl said member is engaged by the pawl intermediate its pivot and said element predeterminately to force the pawl out of engagement with the ratchet, a detent for preventing reverse rotation of the ratchet, said detent being so positioned and related to the pawl that said element of the pawl slides over said detent and out of engagement with the ratchet during another part of the traveling of the pawl.

PHILIP H. CHASE.
JAMES V. O'NEILL.